United States Patent [19]

Moschetto

[11] 4,289,489
[45] Sep. 15, 1981

[54] SELF-ADJUSTING VARIABLE SPEED IDLER PULLEY

[76] Inventor: Rudolph Moschetto, 264 86th St., Brooklyn, N.Y. 11209

[21] Appl. No.: 105,022

[22] Filed: Dec. 19, 1979

[51] Int. Cl.³ ............................................. F16H 55/54
[52] U.S. Cl. ...................................... 474/52; 226/175
[58] Field of Search ....................... 474/47, 48, 49, 50, 474/52, 53, 56; 198/842; 226/175; 74/521

[56] References Cited

U.S. PATENT DOCUMENTS

| | | | |
|---|---|---|---|
| 443,561 | 12/1890 | Avery | 474/53 |
| 687,090 | 11/1901 | Wache et al. | 474/53 |
| 771,006 | 9/1904 | Giraud | 474/53 |

Primary Examiner—C. J. Husar
Assistant Examiner—Conrad Berman
Attorney, Agent, or Firm—Nathaniel Altman

[57] ABSTRACT

An idler pulley, which adjusts itself to variable power transmission speeds by providing a wide range of effective pulley diameters automatically, is disclosed. In its preferred form, the pulley has four spindles with freely rotating sleeves, two directed inwardly from either side, all positioned in the same plane and in changeable circular orbit, for guiding the power transmission belt or chain used with the pulley. The size of the circular orbit of the spindles, corresponding to the effective pulley diameter, is permitted to vary with the power transmission speed by the scissors-like action of the pulley side assemblies which support the spindles.

6 Claims, 6 Drawing Figures

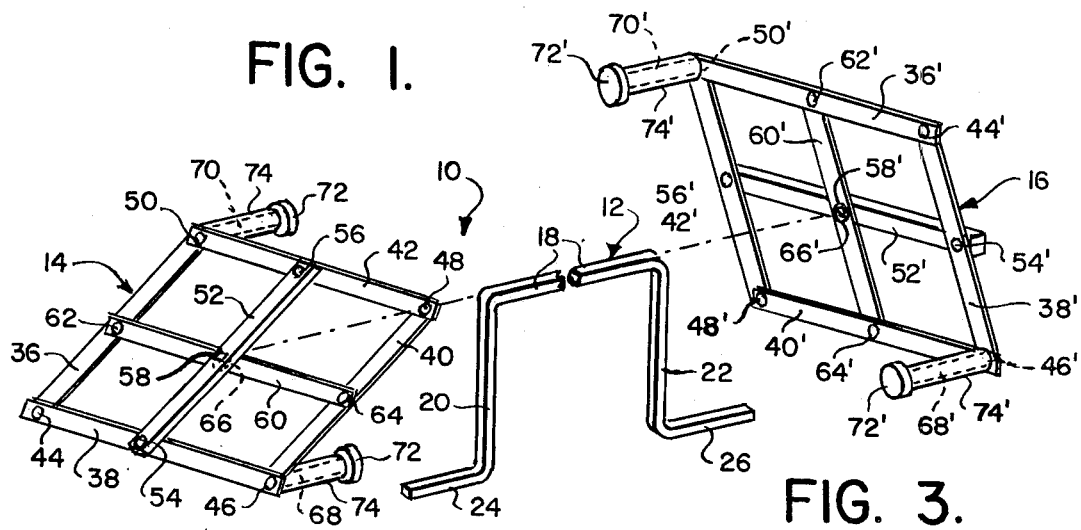
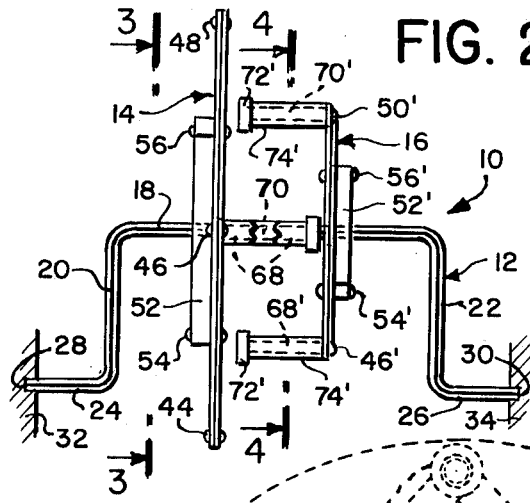
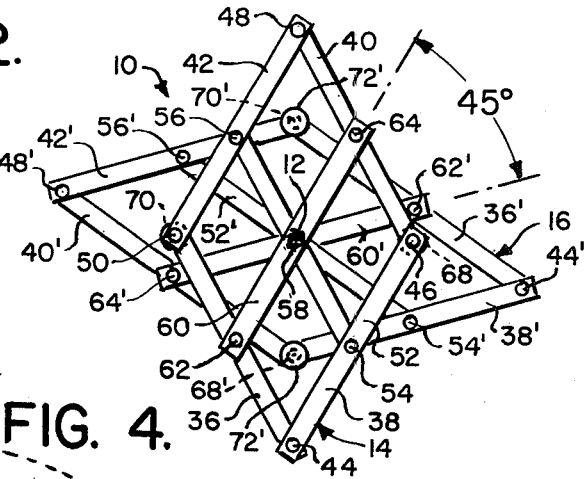
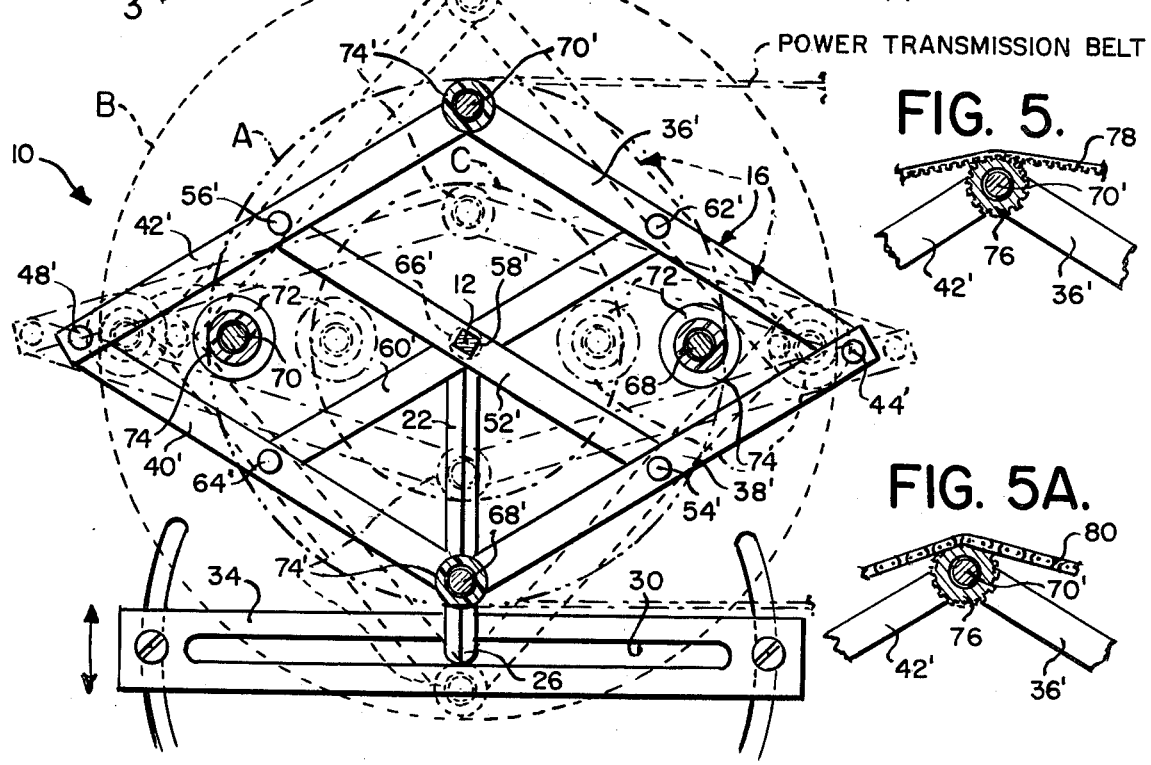

SELF-ADJUSTING VARIABLE SPEED IDLER PULLEY

BACKGROUND OF THE INVENTION

Conventional idler pulleys for power transmission require either substitution or shifting of the transmission belt or chain. In the case of step pulleys, when a change of speed is desired, it is necessary to put a pulley of different diameter into operation. Especially in multiple pulley transmission installations, this requirement can be a laborious time-consuming chore.

Additionally, idler pulleys now in use have inadequate flexibility for maintaining optimum tension on the belts or chains which they carry. Constant attention and adjustments are necessary to prevent excess belt slackness caused by stretching, and to avoid wear and power loss.

The best of the prior art idler pulleys have some adjustability provided by spring-biased moveable flanges, which adjust to relatively small speed changes by carrying their transmission belts higher or lower on the sloped inner flange surface. Typical of this type are variable speed belt drives produced by Lovejoy, Inc. of 2655 Wisconsin Avenue, Downers Grove, Ill. 60515. However, the speed change range on these presently available pulleys is small, and optimum constant tension for uniform operations is difficult to maintain.

It is therefore a primary object of this invention to provide an idler pulley which is self-adjusting to a wide range of transmission speed variation.

Another object of this invention is to provide an idler pulley which automatically adjusts to minor variations in the length of the power transmission belt or chain it carries and maintains an even tension.

Still another object of the invention is to provide a self-adjusting idler pulley which is simple in design and inexpensive to produce.

SUMMARY OF THE INVENTION

All the objects outlined above are met by the novel idler pulley disclosed herein, which, in its preferred form, has a non-rotating shaft of square cross-section on which the two pulley sides, angularly displaced with respect to one another by 45 degrees, are non-rotatably mounted. Each pulley side has four straight edge bars, the ends of which are pivotally connected sequentially to form a rhombus, and a pulley side support bar is centrally bored to fit the mounting shaft, non-rotatably, and is pivotally connected at each end to the center of one of an opposite parallel pair of the four edge bars. A cross-brace, rotatable on the mounting shaft, is pivotally connected at each end to the center of one of the remaining pair of edge bars. Each pulley side carries a pair of spindles extending inwardly from opposite corners, so that a total of four spindles lie in the same plane and in alternating circularly orbital relationship. A freely rotating sleeve, on which the power transmission belt or chain rides, covers each spindle.

Changing speed of the power transmission belt or chain causes the edge bars to pivot on the fixed side support bar and on each other in a scissors-like action, thereby altering the angular configuration of the rhombus formed by the edge bars, shifting the circular orbit of the spindles and thus increasing or decreasing the effective diameter of the pulley.

The concepts and best mode of practising this invention now contemplated will be disclosed in full detail in conjunction with the accompanying drawings, in which:

BRIEF DESCRIPTION OF DRAWINGS

FIG. 1 is an exploded view of the main components of a preferred form of the idle pulley of this invention;

FIG. 2 is a side elevation view of the assembled idler pulley of FIG. 1;

FIG. 3 is a sectional view taken along line 3—3 of FIG. 2;

FIG. 4 is a sectional view taken along line 4—4 of FIG. 3; and

FIGS. 5 and 5A are fragmentary views similar to FIG. 4 showing other embodiments of this invention.

DESCRIPTION OF THE PREFERRED EMBODIMENTS

The idler pulley of FIGS. 1-4, generally designated 10, comprises mounting shaft or crank 12 of square cross-section and pulley side assemblies 14 and 16. Shaft 12 has horizontally disposed center portion 18, on which pulley side assemblies 14 and 16 are mounted, leg portions 20 and 22 substantially perpendicular to center portion 18, and outwardly projecting ends 24 and 26, parallel to center portion 18 and adapted to be carried in slots 28 and 30 of adjustably mounted side supports 32 and 34 respectively (FIGS. 2 and 4), which permit the selective positioning of pulley 10 in the known manner.

Pulley side assembly 14 has edge bar elements 36, 38, 40 and 42 pivotally connected at their ends sequentially at 44, 46, 48 and 50 to form a rhombus as shown. Pulley side support 52 is pivotally connected at one end 54 to the center edge bar 38, at its opposite end 56 to the center of edge bar 42. Centrally located square bore 58 of side support 52 permits mounting of side assembly 14 non-rotatably on pulley support shaft 12. Bore 58 is aligned with the main axis of support 52. A cross-brace 60, pivotally connected to the centers of edge bars 36 and 40 at 62 and 64 respectively may be provided. Centrally disposed bore 66 is large enough to permit free rotation of cross-brace 60 around shaft 12.

A pair of spindles 68 and 70 are mounted to project inwardly from opposite pivot points 46 and 50 respectively. Each spindle has an enlarged end 72, which serves to restrain and guide the power transmission belt to be used with pulley 10, and carries a plastic sleeve 74 freely rotatable on its spindle.

Pulley side assembly 16 is constructed almost identically to side assembly 14, and its parts are designated by prime numbers corresponding to those of assembly 14. Two exceptions are to be noted: spindles 68' and 70' are slightly shorter than corresponding spindles 68 and 70; and square bore 58' of support 52' is angularly disposed with respect to the main axis of support bar 52', so that side assemblies 14 and 16 are offset as shown by an unvarying angle of 45 degrees, when mounted on shaft 12.

FIG. 2 shows the alignment of spindles 68, 70, 68', 70' in a common plane and FIG. 4 illustrates the operation of the pulley 10. The circularly orbital orientation of the four spindles and their associate sleeves 74, 74' is evident in the solid line position of FIG. 4, and the circle A surrounding them indicates the effective pulley circumference of pulley 10 in its solid line position. When the speed of the power transmission belt is changed, as shown in the enlarged pulley diameter of dotted circle B or, alternatively, in the reduced pulley diameter designated by dotted circumference C. This pulley diameter adjustment occurs by the scissors-like action of edge bars 36,38,40,42 and 36',38',40',42' pivoting on pivots 54,56 and 54',56' respectively, while shaft 12 and side supports 52,52' remain unmoved, and pulley side assemblies 14 and 16 remain constantly displaced at an angle of 45 degrees with respect to one another.

FIG. 5 illustrates a modification of the pulley 10 of FIGS. 1-4, wherein sleeve 76 mounted on spindle 70' is toothed to accomodate a timing belt 78, or a chain 80 (FIG. 5A).

The preferred embodiments of the novel idler pulley have been described as illustrative of the concepts of this invention, with various possible modifications envisioned and restricted only by the scope of the ensuing claims.

I claim:

1. Self-adjusting variable-speed idler pulley for guiding a power transmission element, which comprises:
   a non-rotating pulley support shaft; and
   two pulley side wall assemblies, each of said assemblies comprising:
   four edge elements pivotally connected at their ends sequentially to form a parallelogram;
   a side support bar pivotally connected at each of its ends to the center of one of an opposing parallel disposed pair of said four edge elements, said support bar having a centrally disposed bore of a configuration complementary to, and for mounting non-rotatably on, said pulley support shaft;
   a cross-brace pivotally connected at each of its ends to the center of one of the parallely disposed pair of said four edge elements not connected by said side support bar, said cross-brace having a centrally disposed bore for mounting for free rotation on said pulley support shaft;
   a pair of spindles mounted at opposite corners of said parallelogram and projecting inwardly from said side wall assembly in substantially parallel relationship to said pulley support shaft; and
   a pair of sleeve members, one mounted for free rotation on each of said pair of spindles, said sleeve members adapted to carry and guide the power transmission element;
   said two pulley side wall assemblies being mounted non-rotatably on said pulley support shaft in facing relationship, at an angular displacement of 45 degrees with respect to one another, so that said sleeve members on said spindles are aligned in a common plane and are disposed in changeable circular orbital relationship for guiding the power transmission element.

2. Self-adjusting idler pulley in accordance with claim 1, wherein said sleeve members have a substantially smooth outer surface and the power transmission element is a belt.

3. Self-adjusting idler pulley in accordance with claim 1, wherein said sleeve members have a toothed outer surface and the power transmission element is a correspondingly toothed timing belt.

4. Self-adjusting idler pulley in accordance with claim 1, wherein said sleeve members are sprockets mounted for free rotation on said spindles and the power transmission element is a chain adapted to be mounted on and guided by said sprockets.

5. Self-adjusting idler pulley in accordance with claim 1 wherein said parallelogram formed by said four edge elements is a rhombus.

6. Self-adjusting idler pulley in accordance with claim 5, wherein said pulley support shaft has a square cross-section; said first side support bar of one of said pulley side wall assemblies having a bore of square configuration centrally disposed and aligned with the main axis of said first side support bar; and said second side support bar of the opposite of said pulley side wall assemblies having a bore of square configuration centrally disposed at an angle of 45 degrees with respect to the main axis of said second side support bar, whereby said two pulley side wall assemblies are non-rotatably mounted on said pulley support shaft in an angularly displaced relationship with each other of 45 degrees.

* * * * *